Oct. 18, 1955

G. G. GARMAN 2,720,780

TEST SET FOR EXPLOSIVES

Filed Oct. 31, 1952

INVENTOR
GEORGE G. GARMAN

BY

ATTORNEYS

United States Patent Office
2,720,780
Patented Oct. 18, 1955

2,720,780

TEST SET FOR EXPLOSIVES

George G. Garman, Laurel, Md., assignor to the United States of America as represented by the Secretary of the Navy Application October 31, 1952, Serial No. 318,150

7 Claims. (Cl. 73—35)

(Granted under Title 35, U. S. Code (1952), sec. 266)

The invention described herein may be manufactured and used by or for the Government of the United States of America for governmental purposes without the payment of any royalties thereon or therefor.

The present invention relates to apparatus for testing explosive charges, more particularly the invention relates to a portable testing apparatus for measuring the rate and distance of travel of a magnetic mass propelled by an explosive charge to be tested thus to measure the explosive force of the charge. Use is made of a plurality of spaced axially aligned toroidal coils which are series connected and through which the magnetic mass passes when propelled by the explosive charge thus varying the current in the circuit. An ammeter recorder provides a tape recording of the current as the mass passes successively through the coils. A timed pulse generating circuit or other timing device is employed to simultaneously provide on the tape recording a series of time indications in synchronism with the recording provided by the ammeter recorder. The mass is mounted to be propelled vertically along the axis of the coils against the force of gravity, the coils being adjustably mounted to vary the distance between the coils and the distance of the coils with respect to the initial position of the mass.

An object of the present invention is to provide a novel portable testing apparatus for explosive charges which records the current changes in a plurality of energized coils caused by the travel of a magnetic mass into and out of the magnetic fields thereof.

Another object is to provide a novel portable testing apparatus for explosive charges for accurately comparing the explosive forces developed by such charges in a rapid, simple and efficient manner.

Still another object is to provide a novel portable testing apparatus for explosive charges for accurately comparing the relative acceleration forces developed by such charges.

A further object is to provide a novel testing apparatus for explosive charges in which the recording indicating the characteristics of the charge is synchronized with a plurality of markings indicating elapsed time.

Other objects and many of the attendant advantages of this invention will be readily appreciated as the same becomes better understood by reference to the following detailed description when considered in connection with the accompanying drawings wherein.

Figure 1:
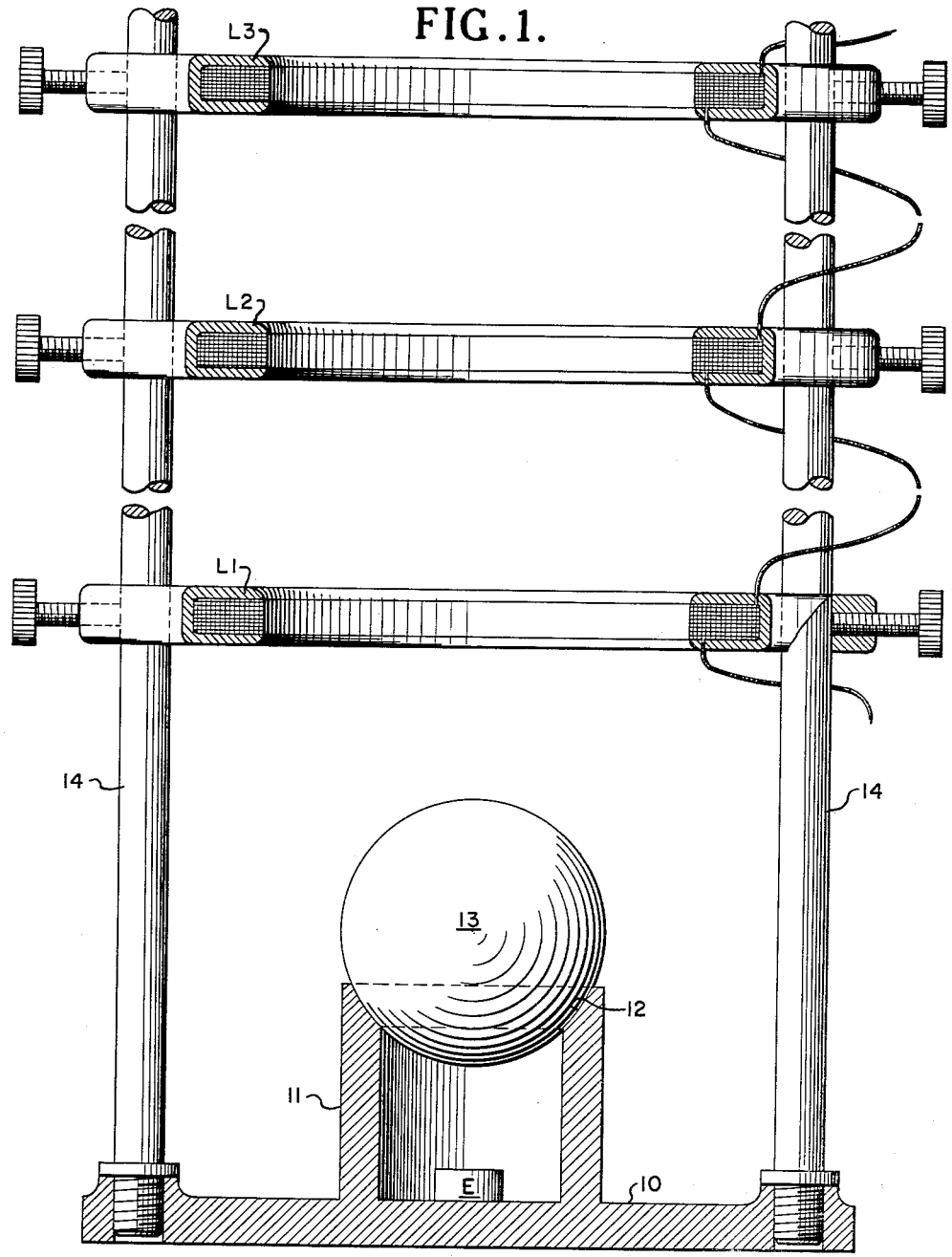
Fig. 1 is a vertical sectional view through the coils, the supporting apparatus therefor and the cylindrical member of the present invention.
Figure 2:
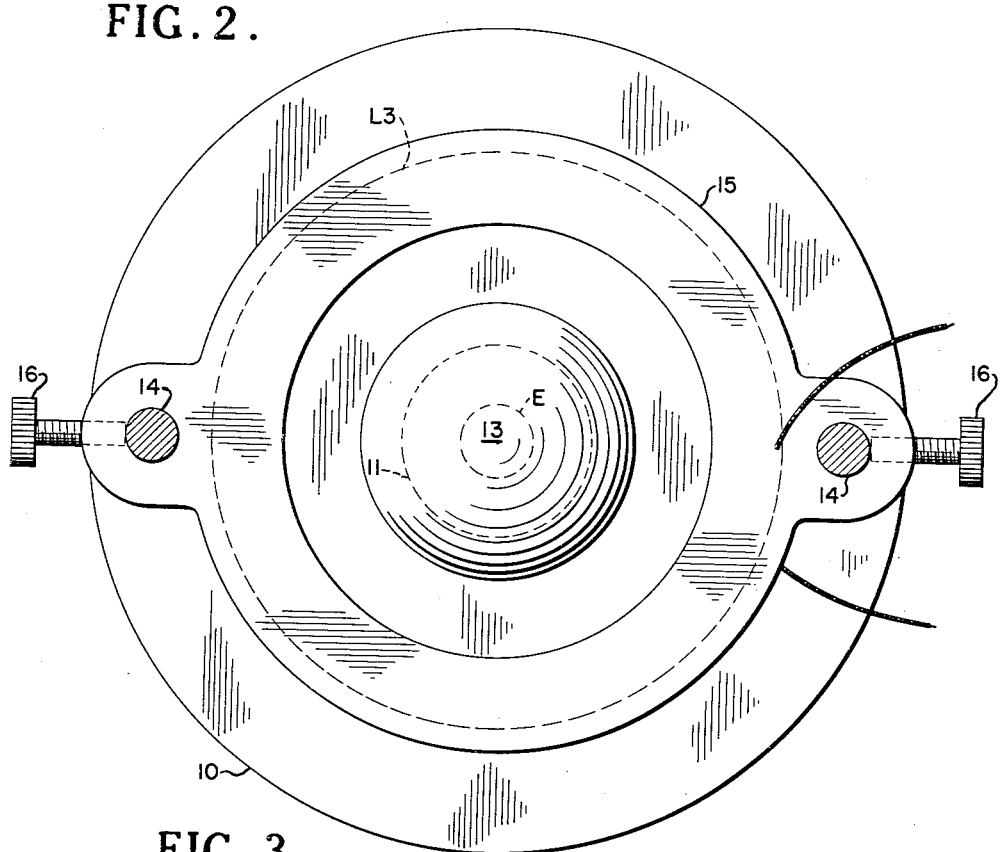
Fig. 2 is a top plan of the device of Fig. 1.

Referring more particularly to the drawings wherein like numerals indicate like parts throughout the several views 10 indicates a base member having a cylindrical portion 11 extending upwardly therefrom. The open end of portion 11 has an arcuately formed seat 12 to receive a sphere or ball 13 formed of magnetic material. Supporting apparatus in the form of posts 14 are secured to base 10 at opposite sides thereof and extend upwardly therefrom. A plurality of toroidal coils L1, L2 and L3 are spaced above base 10.

A non-magnetic support 15 is formed about each of the coils L1, L2 and L3. The supports 15 are slidably mounted on posts 14 and are held in adjusted position thereon by securing devices such as set screws 16. It will thus be seen that coils L1, L2 and L3 may be supported in a plurality of spaced positions with respect to base 10 and with respect to each other.

The explosive charge to be tested is indicated at E and is placed within the cylinder 11, suitable apparatus (not shown) being provided for firing the charge.

When charge E is fired, ball 13 is propelled upwardly against the forces of gravity and in successive order through the magnetic field of each of the coils until the propelling force has been expended. It is apparent that the coils may be provided with a sufficient range of adjustment to effectively compute the propelling force of any desired explosive charge.

Figure 3:
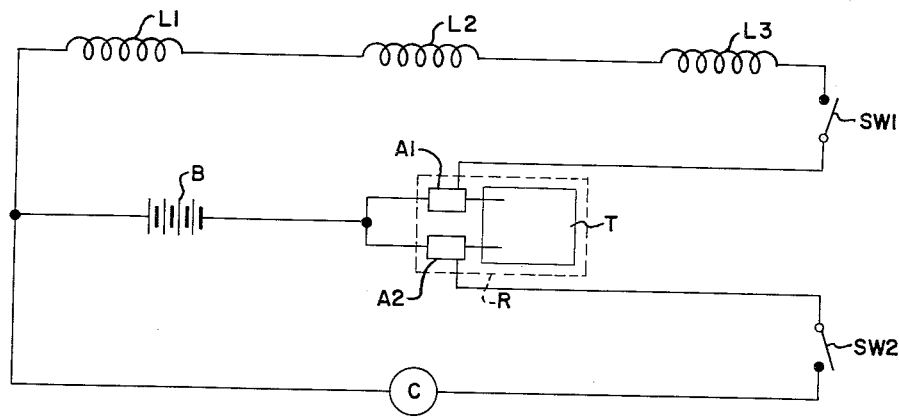
Fig. 3 is a schematic diagram of the recording circuit of the present invention.

As shown in the diagram of Fig. 3, a source of potential, indicated as battery B, the coils L1, L2 and L3, an ammeter type pen operating mechanism A1 of recorder R, and switch SW1 are connected in series. It will thus be seen that when charge E is fired and ball 13 is propelled upwardly thereby, the magnetic field thereof is disturbed as the ball passes through coil L1 causing a change in current in the series circuit. This causes ammeter mechanism A1 to move the pen thereof in accordance with the amount of current change in the coil thus inscribing on a tape T, which is driven at a constant speed, an indication of such current change. The mechanism A1 will also record the indications of such fluctuations of current in the aforedescribed circuit as the ball moves successively through the magnetic flux of each of the other coils, L2 and L3. Thus the recorder will record on tape T a signal indication each time the ball 13 passes the center of one of the coils.

A time pulsing circuit includes the aforementioned source of power B which is connected on one side thereof to a clock operated pulsing mechanism C which is of a type to provide timed electrical impulses in seconds or fractional portions thereof as suited to the conditions of the tests. Mechanism C is connected through switch SW2 to ammeter type pen operating mechanism A2 of ammeter recorder R and thence to the other side of battery B. Mechanism A2 records on tape T, in timed relation with the recordation of A1, the pulses produced by mechanism C. In this manner the recording produced by A1 is synchronized with the timed pulses recorded by A2 and thereby the time required by ball 13 to pass from one coil to the next is recorded. It is also possible from the foregoing recording to ascertain the rate of acceleration and deceleration of the ball during the flight thereof and to ascertain the position of the ball with respect to each of the coils at any time during the flight.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for measuring the force of an explosive charge comprising, in combination, a hollow cylinder having an open end for containing said explosive charge, an arcuate seat formed on said open end of the cylinder, a spherical mass of magnetic material disposed on said seat in sealing engagement with the cylinder and propelled upwardly therefrom when said charge is fired, a plurality of coils energized to produce magnetic fields individual thereto, said coils being spaced in successive order above said cylinder, recording means connected to said coils for measuring the change in current when the magnetic fields of the coils are varied, said spherical member varying the magnetic fields of said coils in successive order as the spherical member is propelled upwardly therethrough.

2. Apparatus for testing an explosive charge comprising, in combination, a hollow cylinder having an open end and containing said explosive charge, a magnetic spherical member adapted to rest on said open end and to be propelled upwardly against the forces of gravity when said charge is fired, a plurality of toroidal coils energized to produce magnetic fields individual thereto, said coils being spaced above said cylinder in successive order and in axial alignment therewith, said coils generating a current when said magnetic fields thereof are varied as the magnetic member is propelled therethrough, means connected to said coils for measuring variations of the current generated by said coils, time controlled means for generating a pulse signal, and recording means connected to said measuring means and said signal generating means for simultaneously recording the output of said coils and said signal.

3. Apparatus for testing the force of an explosive charge comprising, in combination, a container for said charge and having an open end, an arcuate seat formed in the open end of the container, a magnetic mass disposed on said seat in sealing engagement with the container and adapted to be propelled therefrom as the charge is fired in said container, current carrying coil means for producing a plurality of magnetic fields spaced in successive order along the path of travel of said mass, means for providing a series of timed pulses, the current in said coil means varying as said magnetic mass passes through said magnetic fields, and means for recording in timed relation said current variations and said timed pulses.

4. Apparatus for testing the force of an explosive charge comprising, in combination, a hollow cylindrical container for said charge and having an open end at the top thereof, a spherical magnetic mass initially resting on said open end and adapted to be propelled vertically therefrom as the charge is fired in said container, a plurality of energized toroidal coils having magnetic fields individual thereto and spaced vertically in successive order above said container along the path of travel of said mass, means for adjustably supporting said coils with respect to said container, clock means providing electrical impulses in timed sequence, said magnetic mass causing variations in current as the mass travels through the magnetic fields of said coils, a first means electrically connected to said coils for measuring and recording the output thereof, and a second means electrically connected to said clock means for recording said impulses.

5. Apparatus for measuring the explosive force of an explosive charge comprising, in combination, a magnetic spherical mass, a hollow cylindrical member having an open end provided with an arcuate seat conforming to the shape of and adapted to receive said spherical mass in substantially gas tight relation therewith, said cylindrical member receiving said explosive charge, coil means for providing a plurality of magnetic fields in vertically and successively spaced order with respect to said cylindrical member, means for electrically energizing said coil means, recording means connected to said coil means for measuring variations in current, said explosive charge when fired causing said spherical mass to travel vertically from said cylindrical member a distance proportional to the explosive force of said charge.

6. Apparatus for measuring the force of an explosive charge comprising, in combination, a spherical mass of magnetic material, a hollow container for initially supporting said mass until the explosive charge is fired, an arcuate seat formed in said container in sealing engagement with said mass, means for producing a plurality of magnetic fields in spaced successive order vertically of said supporting means, said mass disturbing said magnetic fields as the mass is moved through said fields, means for sensing the disturbance of said magnetic field, recording apparatus operatively connected to said sensing means for indicating said disturbance, and clock means providing timed pulses, said recording apparatus being operatively connected to said clock means whereby said disturbance indications and said timed pulses are recorded in timed relation.

7. Apparatus of the character disclosed for measuring the force of explosion comprising a hollow container having an arcuate seat formed in one end thereof, a movable magnetic mass disposed within said seat in sealing engagement with the container, explosive means for propelling said mass vertically upward from a state of rest in response to explosion of said explosive means, and means including a plurality of toroidal coils disposed in predetermined spaced relation within the path of travel of said mass for indicating the time of passage of the mass therethrough.

References Cited in the file of this patent

UNITED STATES PATENTS

| 1,489,566 | Webster | Apr. 8, 1924 |
| 1,801,449 | Olsen et al. | Apr. 21, 1931 |
| 2,319,219 | Draper et al. | May 18, 1943 |
| 2,372,195 | Gorton | Mar. 27, 1945 |
| 2,400,189 | Carlson et al. | May 14, 1946 |

FOREIGN PATENTS

| 1,655 | Great Britain | July 22, 1858 |